United States Patent [19]

Bloch

[11] Patent Number: 4,538,946
[45] Date of Patent: Sep. 3, 1985

[54] HAND REPAIR TOOL FOR CURVED SURFACES

[75] Inventor: Joseph T. Bloch, Seattle, Wash.

[73] Assignee: The Boeing Company, Seattle, Wash.

[21] Appl. No.: 426,358

[22] Filed: Sep. 29, 1982

[51] Int. Cl.³ .......................... B23C 3/16; B27C 5/10
[52] U.S. Cl. ............................ 409/179; 144/134 D; 144/136 C; 144/144 A; 408/237; 409/182
[58] Field of Search ................. 409/178, 179, 182, 80, 409/237; 144/134 D, 136 C, 144 A, 2 D, 2 N; 408/237

[56] References Cited

U.S. PATENT DOCUMENTS

| D. 50,005 | 12/1916 | Woelz | 30/310 X |
|---|---|---|---|
| 50,677 | 10/1865 | Bennett | 30/310 X |
| 681,945 | 9/1901 | Austen | 30/300 |
| 945,009 | 12/1909 | Rose | 408/110 X |
| 958,941 | 5/1910 | Rose | 30/300 |
| 1,638,086 | 8/1927 | Carter | 144/136 C |
| 1,773,048 | 8/1930 | Linke | 30/300 |
| 1,869,514 | 8/1932 | Seitz | 408/237 |
| 3,007,686 | 11/1961 | Pearson | 408/110 X |
| 3,009,494 | 11/1961 | Hinkley | 144/2 N |
| 3,146,675 | 9/1964 | Anderson | 30/310 X |
| 3,266,346 | 8/1966 | Voissem | 30/310 X |
| 3,635,268 | 1/1972 | Lange | 144/134 D |

FOREIGN PATENT DOCUMENTS 945215 7/1956 Fed. Rep. of Germany ........ 30/310

Primary Examiner—Z. R. Bilinsky
Attorney, Agent, or Firm—William C. Anderson

[57] ABSTRACT

A hand tool (20) useful in the repair of bodies having complex, compound curved surfaces. The tool (20) comprises an adjustable arm (40) mountable at one of its ends to a damaged surface area (15). The other end of the arm (40) is provided with a gimbal mount (50) supporting a cutter assembly (45) and a gripping ball (60) for rotating the tool (20) during use. The gimbal mount (50) and a plurality of orthogonally disposed springs 190 provides a means to ensure that the cutter assembly (45) can follow the contour of the surface area 5 and will be substantially perpendicular to the surface area (15) as the tool (20) is being rotated. A guide (55) provides additional forces to urge the cutter assembly (45) into a position substantially perpendicular to the surface area (15).

13 Claims, 5 Drawing Figures

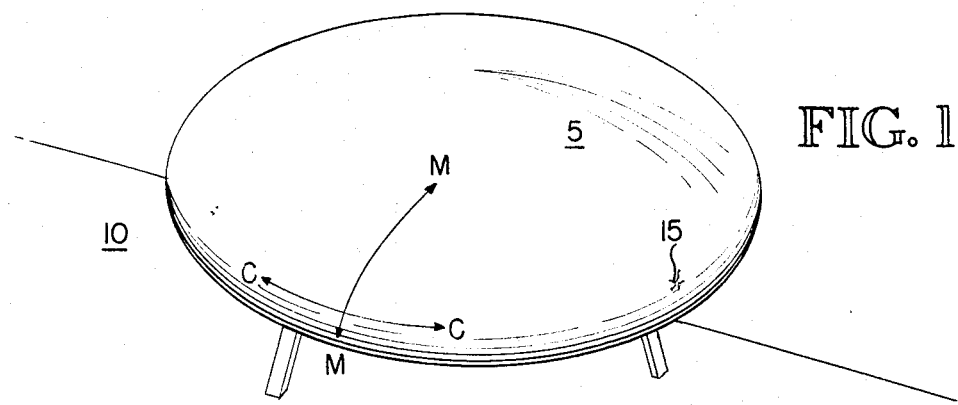
FIG. 1
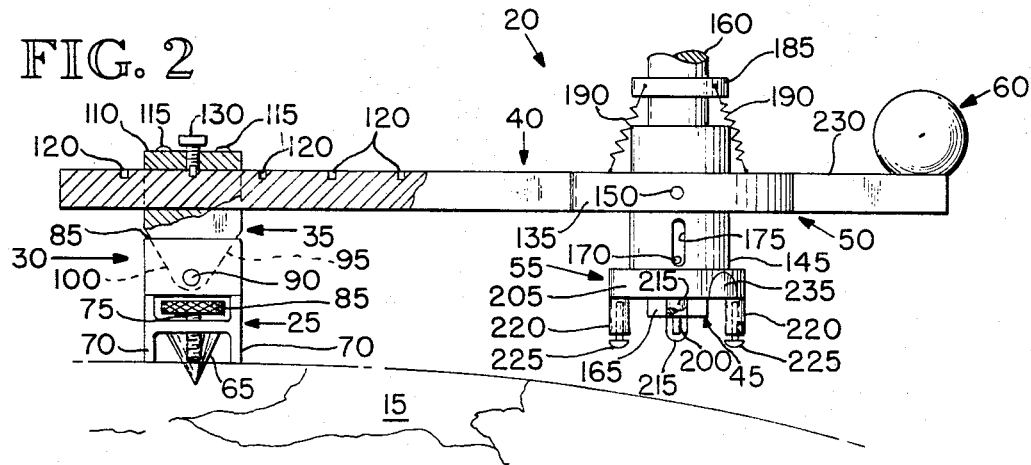
FIG. 2
FIG. 3

HAND REPAIR TOOL FOR CURVED SURFACES

TECHNICAL FIELD

This invention relates to hand tools and more particularly to a hand tool useful in the repair of bodies having complex, compound curved surfaces.

BACKGROUND OF THE INVENTION

At times, it is necessary to repair bodies having complex, compound curved surfaces constructed of, for example, epoxy laminates or aluminum materials. For example, the radar radome of an aircraft or a missile may have a complex, compound curved surface that may be inadvertently damaged during use. Before further use can be made of the radar radome the damaged areas must be repaired.

In the past, radar radomes have been repaired using a variety of tools and methods. For example, a flexible metal strap having a router attached to one end and a pivot connected at the other end has been used. Unfortunately, it is very difficult if not impossible for a human operator using this tool to hold the router normal to the complex, compound curved surface to be repaired. Consequently, the operator is typically not successful in making an accurate cut as the router is rotated about the pivot. Further, this tool or method does not facilitate the making of a patch for the surface area to be repaired.

Another radar radome repair method uses a framework having a plurality of precision router-guiding rails that follow the complex, compound curved surface of the radome. Unfortunately, this repair tool is extremely expensive to construct and very hard to maintain within the tolerances necessary to ensure precise cutting of the complex, compound curved surface.

Finally, an industrial robot has been used to repair the complex, compound curved surfaces of radar radomes. The robot is provided with a router and programmed to make the necessary cuts in the damaged area. While a robot may be successfully employed, it is expensive and requires a relatively highly skilled operator. Also, moving and holding the robot in the required position can present a problem.

SUMMARY OF THE INVENTION

The present invention provides a tool useful in the repair of damaged areas of a complex, compound curved surface. It comprises an adapter for attaching the tool to the approximate centroid of the damaged area. The adapter carries a rotatable mount that pivotably supports a cradle. One end of an extensible operating arm is fixed to the pivotable cradle and the other end of the arm is provided with a fixed ring. An inner ring is pivotably connected to the fixed ring and a pivotable mounting tube is connected to the inner ring. A guide is carried by the lower portion of the tube. The guide is capable of contacting the surface to be repaired and has a pair of legs biasing the cutter of a cutter assembly towards a position which is substantially perpendicular to the surface. The cutter assembly is slidably mounted within the tube and is provided with a plurality of springs which urge the cutter towards the surface to be repaired.

BRIEF DESCRIPTION OF THE DRAWINGS

FIG. 1 represents a radar radome having a damaged surface area.

FIG. 2 illustrates the side view of a preferred embodiment of a cutting repair tool of the present invention attached to the approximate centroid of the damaged surface area of the radar radome of FIG. 1.

FIG. 3 illustrates the plan view of the preferred embodiment of the tool of FIG. 2.

DETAILED DESCRIPTION OF THE PREFERRED EMBODIMENT

Figure 4:
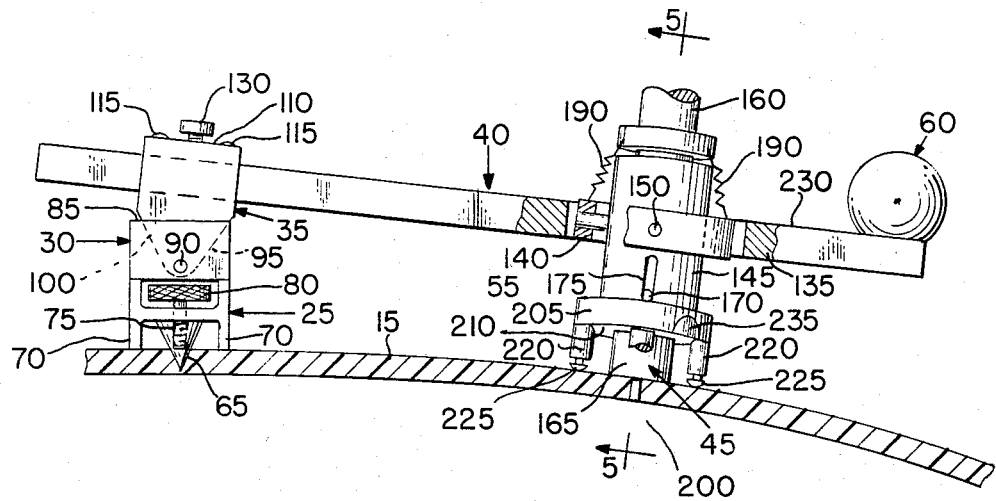
FIGS. 4 and 5 illustrate the operation of the preferred embodiment of the tool of the present invention.

FIG. 1 shows a radar radome 5 as being suitably mounted to a support structure such as an aircraft 10. The radar radome 5 has a complex, compound curved surface constructed of, e.g., a conventional epoxy laminate. While the surface of the radome is difficult to accurately describe verbally, it may generally be described as varying greatly in curvature over a plurality of meridional directions, e.g., along M—M in FIG. 1. Along given points on a selected meridional direction, the surface varies in a complex manner circumferentially, e.g., along C—C in FIG. 1.

During normal use, the radar radome 5 may be inadvertently damaged, as at 15, which must be repaired before the radar radome 5 can be operated properly. A preferred embodiment of the repair tool of the present invention is shown generally at 20 in FIG. 2 as being disposed over the damaged area 15. The tool 20 comprises an adapter 25, a cylindrical mount 30, a cradle 35, an extensible operating arm 40, a cutter assembly 45, a gimbal mount 50, a guide 55 and a gripping ball 60.

The adapter 25 provides a means to attach the tool 20 to the approximate centroid of the damaged area 15. The adapter 25 is a cylindrical housing and comprises a central screw 65, integral with the adapter housing, and a pair of oppositely disposed stabilizing legs 70 for contacting the surface of the damaged area 15. A pair of oppositely disposed adjustment thumb screws 75 threadingly engage the adapter housing. The thumb screws 75 are disposed at a right angle to the legs 70 and are provided with a knurled head 80. The screws 75 may be used to ensure that the adapter 25 positively contacts the surface of the damaged area 15 and stabilized the tool 20. Optionally, a suction cup, adhesive or any equivalent (none of which is shown) may be used to attach the tool 20 to the approximate centroid of the damaged area 15.

The mount 30 may be attached or carried by the adapter 25 by means of an internal shoulder bolt (not shown for purposes of clarity) that allows the mount 30 to rotate with respect to the adapter 25. The cradle 35 fits within a slot 85 formed within the upper portion of the mount 30 and is allowed to pivot therein by means of a shoulder bolt 90 passing through both the mount 30 and the cradle 35. The pivotable motion of the cradle 35 is limited by a pair of surfaces 95 and 100 formed on opposite sides of the cradle 35.

One end of the operating arm 40 is carried within a slot 105 formed within the upper portion of the cradle 35 and may be held in place by means of a cover plate 110 fixed by a suitable fastener such as a plurality of conventional screws 115.

The operating arm 40 has a plurality of serially arranged indentations or holes 120 that may be aligned with a hole 125 disposed within the cover plate 110. The relative position of the arm 40 with respect to the cradle 35 may be extended or adjusted by inserting a pin 130 through the hole 125 and into a hole 120 selected at the option and need of an operator of the tool 20.

The gimbal mount 50 is carried by the other end of the arm 40 and comprises an outer ring 135 connected to or integral with the arm 40, an inner ring 140 and a cutter mounting tube 145. The inner ring 140 is pivotably connected to the outer ring 135 by means of a first pair of pins 150. Also, the cutter mounting tube 145 is mounted so that it is pivotable with respect to the inner ring 140 by means of a second pair of pins 155 that are perpendicular to the first pair of pins 150. As a result, the inner ring 140 is free to pivot about an axis which is perpendicular to the axis about which the cutter mounting tube 145 is allowed to pivot.

Slidably supported within the tube 145 is the cutter assembly 45 comprising a motor, such as, for example, a fluid operated or a pneumatic motor 160. The motor is suitably coupled (by a conventional means, not shown) to any conventional cutter, e.g., a router 165. The router 165 is provided with a pin 170 that fits within a key-way 175 formed within the mounting tube 145.

In use, the pin 170 and the keyway 175 prevent rotation of the router 165 with respect to the tube 145 while allowing vertical movement of the router (see FIGS. 4 and 5) for an indication of the possible movement by reference to the relative location of the pin 170 with respect to the keyway 175) as the tool 20 is rotated over the damaged surface area 15 during use.

An adapter clamp 185 circumscribes the motor 160, and is provided with a plurality of tension springs 190 that are attached to both the adapter clamp 185 and to the outer ring 135 (see FIG. 4). The springs 190 tend to bias or urge the cutter assembly 45 towards the damaged surface area 15 and help the guide 55 orient the router bit 200 of the router 165 towards a position which is substantially perpendicular to the surface of the damaged area 15, as will be understood better hereinafter.

Disposed at the lower end of the mounting tube 145 is the guide 55. The guide 55 comprises a ring 205 that is provided on its undersurface 210 (see FIG. 4) with two pairs of or orthogonally disposed guide feet 215 and 220. The guide feet 215 comprise fixed contacts while the guide fee 220 comprise spring loaded contacts 225. In use, the spring loaded contacts 225 cooperate with the guide feet 215 to allow the cutter assembly 45 to follow closely the surface of the damaged area 15. The guide feet 215 and 220 also force the cutter assembly 45 to be oriented towards positions wherein the router bit 200 is able to make cuts perpendicular to the surface of the damaged area 15 as the tool 20 is rotated about the central rotational axis of the mount 30.

It is important that the guide 55 be provided with the fixed guide feet 215 and the spring biased guide feet 220. If the guide 55 were to be provided with two pairs of fixed feet, it would be difficult if not impossible for an operator to stabilize the tool 20 to ensure that perpendicular surface cuts are made. Although it would be less difficult, an operator would still have problems stabilizing the tool 20 if the feet 215 were also provided with spring biased contacts, as are the feet 220, i.e., the tool 20 would have a greater tendency to rock as the tool 20 is rotated during use.

The ball 60, connected to the outer ring 35 by a extension 230 of the operating arm 40, provides a convenient hand gripping point to enable an operator to rotate the tool 20 during use.

Figure 5:
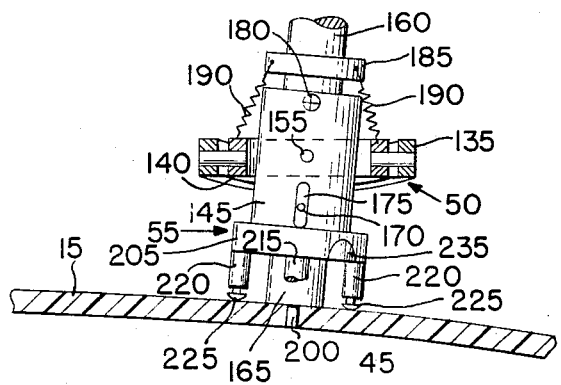

The operation of the tool as assembled in FIG. 2 should be generally apparent to those skilled in the art. Briefly, however, in use the adapter 25 is fastended to the approximate centroid of the surface of the damaged area 15. The thumb screws 75 are used as an aid to insure that the adapter 25 is positively affixed to and stable with respect to the surface of the area 15. The operating length of the extensible arm 40 is determined by selecting a hole 120 so that the router bit 200 will be able to extend slightly further than the area of the damaged area 15. After all adjustments have been made, an operator of the tool 20 may utilize the gripping knob 60 to rotate the tool and cause the router bit 200 to cut into the surface of the damaged area 15 as illustrated in FIGS. 4 and 5.

As the cutting assembly 45 moves over the damaged surface area 15, it must follow the complex, compound curved surface of the area 15 in order to remove the damaged epoxy laminate of the area 15. However, during this movement over the complex, compound curved surface of the damaged area 15, the router bit 200 of the assembly 45 must also be maintained in a position which is substantially perpendicular to the surface of the damaged area 15. As can be well understood by a skilled artisan, this controlled motion is accomplished by means of the gimble mount 50, the guide feet 220 and 215, which tend to urge the router bit 200 into a position which is substantially perpendicular to the surface of the damaged area 15, and the springs 190, which tend to urge the cutter assembly 45 towards the damaged surface area and cooperate with the guide feet 220, 215 to urge the router bit into the desired perpendicular position.

Optionally, a micrometer depth adjustment (not shown for purposes of clarity) can be provided for the router 165 whereby various depths of cut by the router 165 may be achieved. Further, the guide ring 205 may be provided with one or more openings 235 to enable an operator to manipulate the micrometer depth adjustment.

While the present invention has been specifically described as being useful in the repair of the epoxy laminate of a radar radome it will be clear to the skilled artisan that the present hand tool is generally useful for the repair of the complex, compound curved surfaces of any structure, for example, an automobile, boat hull, aircraft or missile section. Furthermore, the present invention may be used to effect appropriate cuts on aluminum structures. Additionally, the present invention may be used to fabricate appropriately configured patches for the damaged area. Finally, while the tool 20 may be rotated manually, a suitable mechanically powered means may be employed.

What is claimed and desired to be secured by Letters Patent of the United States is:

1. A tool useful in the repair of damaged areas of a complex, compound curved surface, said tool comprising:
    means for attaching the tool to said surface;
    means carried by said attaching means capable of rotation with respect to said attaching means;
    means carried by said rotatable means capable of pivoting with respect to said rotatable means;
    an operating arm having one end carried by said pivotable means;
    a fixed ring disposed at the other end of said arm;
    an inner ring pivotable connected to said fixed ring;

a mounting tube pivotably connected to said inner ring;

a guide means carried by the lower portion of said tube and being capable of contacting said surface for biasing said cutter towards a position that is substantially perpendicular to said surface;

a cutter assembly slidably carried by said tube, and means for urging said cutter assembly towards said surface.

2. The tool of claim 1, wherein said guide means comprises:

a plurality of orthogonally disposed legs capable of contacting said surface, at least two of said legs being spring biased towards said surface.

3. The tool of claim 2, wherein said urging and biasing means comprises:

a plurality of orthogonally disposed springs carried at one end by said cutter assembly and at another end by said fixed ring.

4. The tool of claim 3, further comprising:

means for adjusting the position of said arm with respect to said pivotable means.

5. The tool of claim 4, further comprising:

an elongated slot formed in said tube, and a pin extending from said cutter assembly into said elongated slot, whereby in use, rotation of said cutter assembly with respect to said tube is prevented.

6. The tool of claim 5, wherein said attaching means comprises:

a screw for threading into said surface, a plurality of stabilizing legs capable of contacting said surface and being disposed proximate said screw, and a plurality of oppositely disposed adjustment thumb screws for ensuring a positive contact with said surface.

7. The tool of claim 4, wherein said arm adjusting means comprises:

a plurality of indentations disposed within said arm, said arm being carried in a slot formed within said pivotable means, said arm being fixed by a plate affixed to said pivotable means;

said plate being provided with a hole capable of being in alignment with one of said indentations, and a pin capable of insertion within said hole and said one indentation.

8. The tool of claim 7, further comprising:

a manual gripping ball disposed at a distal end of said arm whereby the rotation and use of said tool is facilitated.

9. The tool of claim 2, wherein said spring biased legs are aligned with the longitudinal axis of said arm.

10. The tool of claim 8, wherein said spring biased legs are aligned with the longitudinal axis of said arm.

11. The tool of claim 6, wherein said arm adjusting means comprises:

a plurality of indentations disposed within said arm, said arm being carried in a recess formed within said pivotable means, said arm being fixed by a plate affixed to said pivotable means;

said plate being provided with a bore capable of being in alignment with one of said indentations, and a pin capable of insertion within said bore and said one indentation.

12. The tool of claim 11, further comprising:

a manual gripping ball disposed at a distal end of said arm whereby the rotation and use of said tool is facilitated.

13. The tool of claim 12, wherein said spring biased legs are aligned with the longitudinal axis of said arm.

* * * * *